(12) United States Patent
Alapuranen

(10) Patent No.: US 6,744,766 B2
(45) Date of Patent: Jun. 1, 2004

(54) HYBRID ARQ FOR A WIRELESS AD-HOC NETWORK AND A METHOD FOR USING THE SAME

(75) Inventor: Pertti O. Alapuranen, Melbourne, FL (US)

(73) Assignee: MeshNetworks, Inc., Maitland, FL (US)

(*) Notice: Subject to any disclaimer, the term of this patent is extended or adjusted under 35 U.S.C. 154(b) by 0 days.

(21) Appl. No.: 10/347,403

(22) Filed: Jan. 21, 2003

(65) Prior Publication Data

US 2004/0010736 A1 Jan. 15, 2004

Related U.S. Application Data

(60) Provisional application No. 60/385,564, filed on Jun. 5, 2002.

(51) Int. Cl.[7] .......................... H04L 12/28; H04L 12/56
(52) U.S. Cl. .................... 370/394; 370/474; 370/328
(58) Field of Search ........................ 370/351–356, 370/389, 392, 394, 400, 401, 465, 471, 474, 338, 349, 328; 714/748, 749, 758, 751

(56) References Cited

U.S. PATENT DOCUMENTS

| | | | |
|---|---|---|---|
| 4,439,859 A | 3/1984 | Donnan | 371/32 |
| 4,494,192 A | 1/1985 | Lew et al. | 364/200 |

(List continued on next page.)

FOREIGN PATENT DOCUMENTS

| | | |
|---|---|---|
| CA | 2132180 | 3/1996 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

(List continued on next page.)

*Primary Examiner*—Ajit Patel
(74) *Attorney, Agent, or Firm*—Gardner Carton & Douglas LLP; Joseph J. Buczynski

(57) ABSTRACT

A system and method for data transmission incorporating a hybrid automatic repeat request (ARQ) function at each node in an ad-hoc network. Each node is configured to calculate an optimum segment size for transmission and thereafter executes the ARQ function to transmit and receive data segments with forward error correction and error detection coding. The coding allows the node to detect and locate errors within received segments and to provide an acknowledgement only after all segments are correctly received. A negative acknowledgement from the receiving node states the location of failed segments, and only failed segments are then retransmitted. The failed segments can be retransmitted in their original location and in other segment locations which contained segments that did not fail, thus reducing maximum time to successfully deliver the segments.

40 Claims, 4 Drawing Sheets

U.S. PATENT DOCUMENTS

| | | | |
|---|---|---|---|
| 4,584,685 A | 4/1986 | Gajjar | 371/35 |
| 4,617,656 A | 10/1986 | Kobayashi et al. | 370/74 |
| 4,718,066 A | 1/1988 | Rogard | 371/35 |
| 4,726,027 A | 2/1988 | Nakamura et al. | 371/32 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,313,473 A | 5/1994 | Darmon et al. | 371/35 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas et al. | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,629,948 A | 5/1997 | Hagiwara et al. | 371/32 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,784,362 A | 7/1998 | Turina | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,421,803 B1 | 7/2002 | Persson et al. | |
| 6,615,382 B1 | 9/2003 | Kang et al. | |
| 2001/0053699 A1 | 12/2001 | McCrady et al. | 455/513 |
| 2001/0055290 A1 | 12/2001 | Seidel et al. | |
| 2002/0015416 A1 | 2/2002 | Lee et al. | |
| 2002/0196812 A1 | 12/2002 | Yamaguchi et al. | |
| 2003/0167433 A1 | 9/2003 | Wengerter et al. | |

OTHER PUBLICATIONS

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self–Organizing, Self–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactical Multi–Channel Software Radios".

US 6,744,766 B2

HYBRID ARQ FOR A WIRELESS AD-HOC NETWORK AND A METHOD FOR USING THE SAME

This application claims benefit under 35 U.S.C. §119(e) from U.S. provisional patent application serial No. 60/385,564 entitled "Hybrid ARQ For A Wireless Ad-Hoc Network And A Method For Using The Same", filed on Jun. 5, 2002, the entire contents of which is incorporated herein by reference.

BACKGROUND OF THE INVENTION

1. Field of the Invention

The present invention relates to a system and method for data transmission incorporating an automatic repeat request (ARQ) function. Specifically, the present invention relates to a system and method for computing an optimum segment size for data transmission and providing an acknowledgement only after all segments are received correctly at a receiver. A negative acknowledgement states the location of failed segments, and only failed segments are then retransmitted.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communication signals may include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc" network has been developed for use by the military. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in conventional ad-hoc networks, further enable mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

Communications between nodes however, is often subject to interference and transmission errors. To minimize the occurrence of erroneous data, receivers and transmitters may be configured to detect transmission errors and request retransmissions if such errors are detected. For instance, a data transmission system between nodes may include an automatic repeat request (ARQ) transmitter and receiver, each adapted to use an error correction code. As may be appreciated by one skilled in the art, the ARQ transmitter may be used to include error detection codes in the transmission data stream to a remote receiver. The ARQ receiver may then be used to detect errors in the data stream using such codes and request retransmission from the transmitter. Further details of ARQ application and use of error detection codes may be found in U.S. Pat. No. 5,629,948 to Hagiwara et al., and in U.S. Pat. No. 5,784,362 to Turina, the entire content of each being incorporated herein by reference. The selective use of ARQ with a sliding window transport mechanism is also discussed in U.S. Pat. No. 5,717,689 to Ayanoglu, the entire content of which is also incorporated herein by reference. Yet another ARQ retransmission technique using a "go-back-n" ARQ command is discussed in U.S. Pat. No. 4,726,027 to Nakamura et al., the entire content of which is incorporated herein by reference.

Still other techniques involve frame numbering, such that frames may be identified for retransmission when errors are detected. Frame numbering allows a receiver to send a sequence number to a transmitter requesting retransmission of incorrect frames, similar to the "go-back-n" ARQ technique. Details of frame numbering in data transmissions are discussed in U.S. Pat. No. 4,439,859 to Donnan, the entire content of which is incorporated herein by reference.

Given that retransmissions due to error detection will occur, various efforts have been made in order to minimize delays due to frequent retransmissions. For instance, information blocks may be enlarged to provide extra room for "catch up" when a large number of repeat transmissions occur. Additional details of enlarged information blocks are discussed in U.S. Pat. No. 5,313,473 to Darmon et al., the entire content of which is incorporated herein by reference.

A self-adaptive and hybrid data transmission link using a new ARQ principle is discussed in U.S. Pat. No. 4,718,066 to Rogard, the entire content of which is incorporated herein by reference. The Rogard system encodes data in sets of blocks including redundant symbols and blocks, and provides automatic retransmission of lost data blocks and correction of detected errors. Although a Reed Solomon code is discussed in Rogard, the use of a Golay code as an error correction code is discussed in U.S. Pat. No. 4,584,685 to Gajjar, the entire content of which is also incorporated herein by reference.

Many of these techniques require retransmission of frames which may not include errors, or perform other operations during retransmission, which slow overall data transmission rates. Accordingly, a need exists for an ARQ technique adapted for use in a wireless ad-hoc network which will more accurately request retransmissions and not require the retransmission of frames, or segments, which do not have a detected error.

SUMMARY OF THE INVENTION

An object of the present invention is to provide a system and method for a hybrid automatic repeat request (ARQ) function for a wireless ad-hoc network.

Another object of the present invention is to provide a system and method for dividing a media access control protocol data unit (MPDU) into a stream of segments, each including forward error correction and error detection coding.

Still another object of the present invention is to provide a system and method to sequentially transmit a stream of segments as a physical layer packet and detect and locate any failed segments, and retransmit erroneous segments multiple times per media access control (MAC) transaction.

These and other objects are substantially achieved by implementing a hybrid automatic repeat request (ARQ) function at each node in an ad-hoc network. Each node is configured to calculate an optimum segment size for transmission and thereafter executes the ARQ function to transmit and receive data segments with forward error correction and error detection coding. The coding allows the node to detect and locate errors within received segments and to provide an acknowledgement only after all segments are correctly received. A negative acknowledgement from the receiving node states the location of failed segments, and only failed segments are then retransmitted. The failed segments can be retransmitted multiple times per MAC transaction reducing maximum time to successfully deliver the segments. Using an algorithm, the hybrid ARQ-function at each node in the ad-hoc network reduces the total time by resending erroneous segments multiple times. Where overhead is fixed, and independent of physical frame length, savings can be achieved by reducing the need for frame headers in multiple retransmissions when failed segments can be retransmitted multiple times per MAC transaction. The failed segments can be retransmitted in their original location and in other segment locations which contained segments that did not fail.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
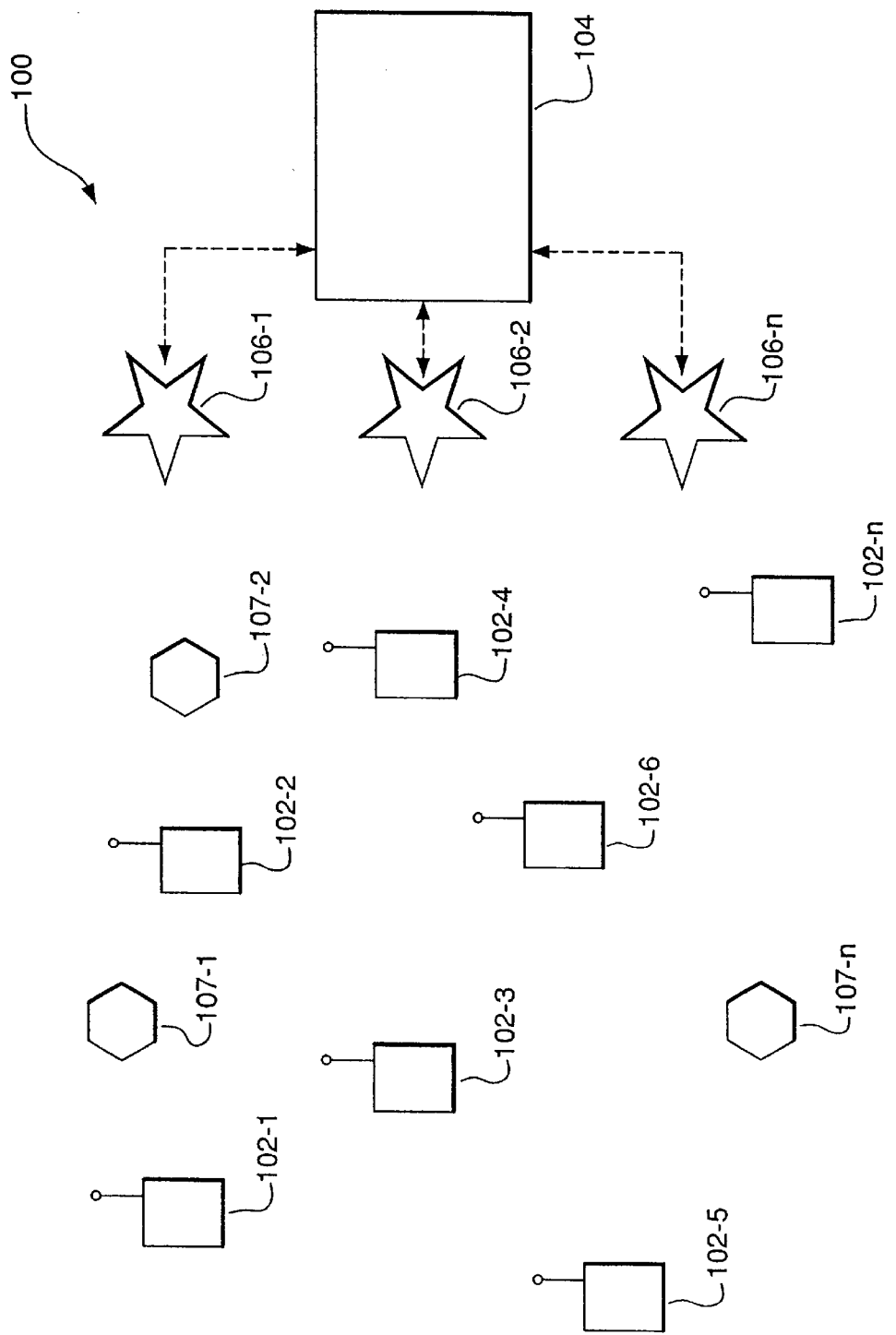
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or routers 107) for routing data packets between other nodes 102, 106 or 107. It is noted that for purposes of this discussion, the nodes discussed above can be collectively referred to as "nodes 102, 106 and 107", or simply "nodes".

Figure 2:
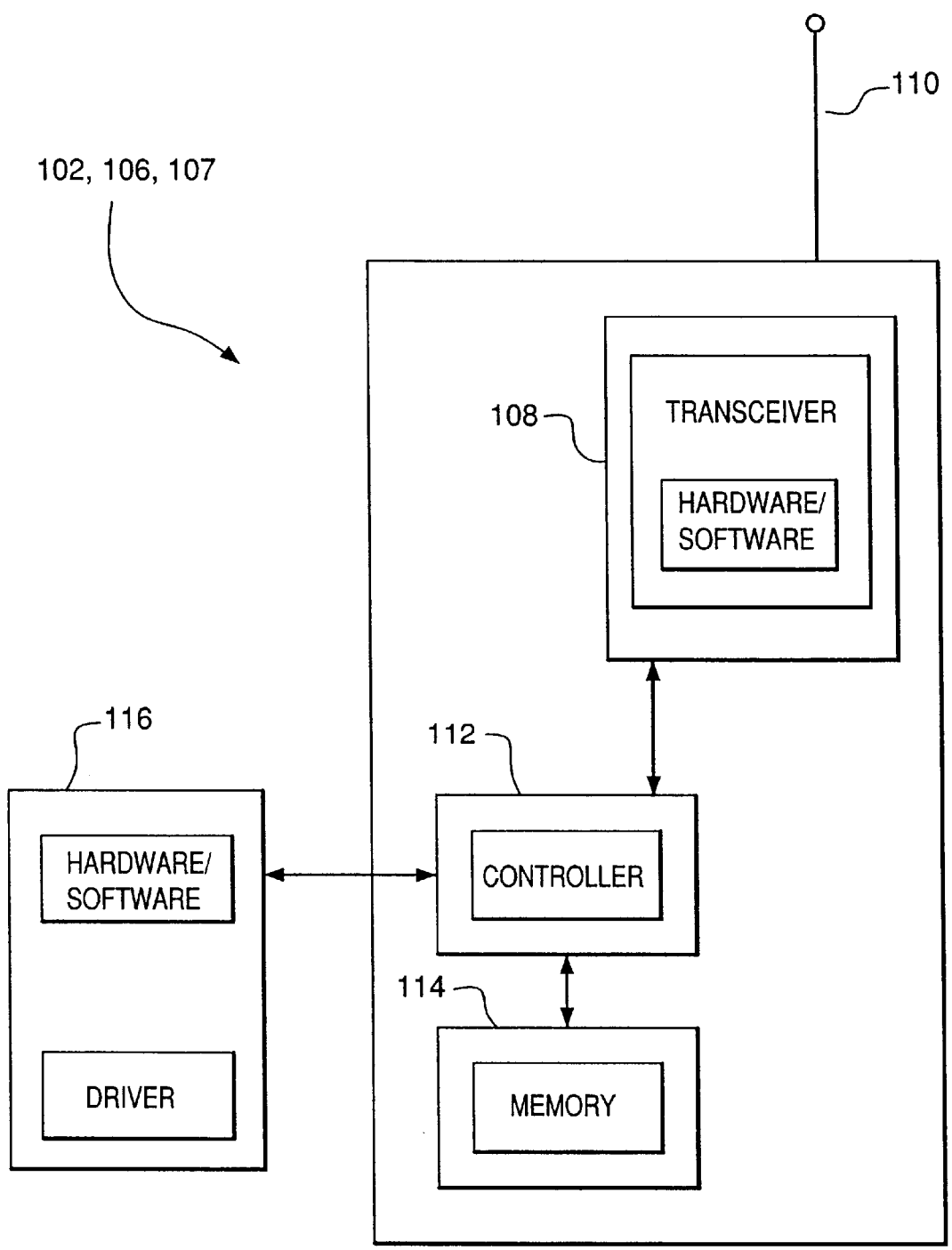
FIG. 2 is a block diagram illustrating an example of a mobile node employed in the network shown in FIG. 1.

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. patent application Ser. Nos. 09/897,790, 09/815,157 and 09/815,164, referenced above. As shown in FIG. 2, each node 102, 106 and 107 includes a transceiver 108 which is coupled to an antenna 110 and is capable of receiving and transmitting signals, such as packetized data, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes periodically exchange respective routing information, referred to as routing advertisements or routing table information, via a broadcasting mechanism, for example, when a new node enters the network or when existing nodes in the network move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software to perform automatic repeat request (ARQ) functions, as set forth in greater detail below.

In one embodiment of the present invention described below, a hybrid automatic repeat request (ARQ) function for an ad-hoc network as shown in FIG. 1 is presented in which shorter error correction segments are used to improve segment error rate. In a typical data transmission system using an ARQ function, a transmission side data terminal is used to output a bit stream of transmission data, which is then given to an ARQ transmitter. At the ARQ transmitter, or transceiver, error detection codes are attached to the transmission data and resulting transmission signals in the ARQ segments are transmitted to an ARQ receiver on a reception side via a transmission path. At the ARQ receiver, the presence of an error is checked for each segment of the received signals, and a re-transmission request signal is transmitted to the ARQ transmitter whenever an error is detected. When no errors are detected in the received signals, the ARQ receiver, or transceiver, outputs the received data to a reception side data terminal and transmits a successful reception signal to the ARQ transmitter.

In the embodiment of the present invention described below, the size of the transmitted signal segment is reduced. Specifically, signal segments are shorter and multiple segments are sent per each ad-hoc ready-to-send/clear-to-send sequence. The length of segment in this case, is used to describe the data amount that has to be retransmitted if a segment is erroneous. Due to high data rates, an interleaver is not useful for mitigating fading channels. Instead, an ARQ should be used, and packet length should be shorter than average non-fade period (ANFP).

To achieve this in accordance with an embodiment of the present invention, the transceiver 108 of a node, such as nodes 102, 106 and 107 of FIG. 1, is directed to send a media access control protocol data unit (MPDU) as a stream of segments to a receiving node. Each segment contains forward error correction (FEC) and error detection, for example, Viterbi encoding for FEC, and cyclic redundancy check (CRC) error detection. As described above, at the ARQ receiver, the presence of an error is checked for each segment of the received signals, and a re-transmission request signal is transmitted to the ARQ transmitter whenever an error is detected. When no errors are detected in the received signals, the ARQ receiver, or transceiver, outputs the received data to a reception side data terminal and transmits a successful reception signal to the ARQ transmitter. At the receiving node, if a segment has errors after FEC has been performed and the segment has no information to locate errors, the entire segment has to be retransmitted.

Transmissions between transmitting and receiving nodes may include a physical layer packet which can consist of single or multiple segments in a data stream. The number of segments is computed by dividing the length of MPDU by a system constant for a maximum segment size. Maximum segment size is a network specific constant and is known to the transmitter and receiver of the transceiver 108 of each node 102, 106 or 107. Each segment is the same size, however, the last segment may be shorter than the maximum segment size. Additionally, each segment has a segment number which is sequential only within the same MPDU.

As described above, each segment can be transmitted as a physical layer packet, each of which has parity and forward error correcting coding. A parity code is used to verify correctness of the data in the segment, and segments that fail parity check are thrown away by the receiver. Additionally, each physical layer packet contains the length of the packet, but typically not the length of the MPDU. An acknowledgement (ACK) of successful reception is sent by the receiving node 102, 106 or 107 only after all the segments in MPDU are received correctly. A negative acknowledgement (NACK) is sent in the event of failed or erroneous segment reception, and contains the locations of any failed segments, such as the segment number.

However, in yet another embodiment of the present invention, an acknowledgement (ACK) of successful reception is sent by the receiving node after fewer than all the segments are received correctly. This embodiment is typically applicable in a digital voice link where some segments are identified as vocoder frames. In these cases, having a nonzero segment error rate is acceptable. Segment error rate can be derived from vocoder frame error rate requirement that is typically 1–5%. For some applications, the ARQ may work by trying to achieve 5% vocoder FER while retransmitting segments multiple times to minimize latency in a multihop system.

During the retransmission of failed or erroneous segments, segments that are transmitted correctly are not retransmitted. Erroneous segments however, are retransmitted multiple times per MAC transaction. Any failed segments can be retransmitted in their original locations or in other locations that did not fail and did not require retransmission. This reduces the maximum time to successfully deliver MPDU but reduces the throughput compared to a sliding window method or some other methods. For example, when a MPDU of 1500 bytes is segmented to ten 150 byte segments, which are packed to one physical frame and are transmitted using a typical ARQ method, the actual bandwidth taken from the system contains overhead which may be up to 10–50% of the packet transmission time. For very short packets this may be a high number, for example 80%. If the example has a 30% segment error rate, then 30% of the segments transmitted through the link are lost due to marginal link and fading. Therefore, after the first transmission of 10 segments, 3 segments are incorrectly received and need to be retransmitted. In many situations these segments have to be retransmitted in a packet that contains only these 3 segments because there is no more data in transmit buffers. When these 3 segments are retransmitted through a 30% link, 1 segment is still incorrect after the first retransmission and has to be retransmitted. In a case where fixed overhead is high and wherein such overhead is independent of physical frame length, it is more economical to retransmit all the erroneous segments twice.

In the example above where 30% of segments are received incorrectly, sending frame headers takes 20 time units and each segment takes 10 units, and each transmission requires channel contest and uses 20 time units, a conventional ARQ method produces the following results. These values are presented for illustration, and in actual practice, header overhead is much larger than 20, and channel contest may add delays of 100 time units and may take system capacity for this amount.

The results of a conventional ARQ method in the above example are shown in Table 1 below.

TABLE 1

| | |
|---|---|
| acquire channel | time 20 |
| transmit 10 receive 7 indicate 3 missing segments | time 20+100=120 |
| acquire channel | time 20 |
| transmit 3 receive 2 indicate 1 missing segment | time 20+30=50 |
| acquire channel | time 20 |
| transmit 1 receive 1 ACK segment | time 20+10=30 |
| total time | time 20+120+20+50+20+30=260 |

The algorithm of the embodiment of the present invention reduces total time by sending erroneous segments multiple times. Where sending a frame takes 20 time units and each segment takes 10 units, the results using the embodiment of the present invention are shown in Table 2 below.

TABLE 2

| acquire channel | time 20 |
|---|---|
| transmit 10 receive 7 indicate 3 missing segments | time 20+100=120 |
| acquire channel | time 20 |
| transmit 6 receive 4 ACK segments | time 20+60=80 |
| total time | time 20+120+20+80=240 |

With the algorithm of the embodiment of the present invention, the data was delivered with less latency. In an ad-hoc network, the embodiment of the present invention uses 1 less transmission, which reduced control channel usage by 30% and creates an important system level advantage.

To achieve this, the transmitter retransmits only erroneous segments and may retransmit them multiple times. The transmitter transmits all the segments in physical frame after the first erroneous segment, and transmits segments that are individually encoded by error correction code (FEC). The receiver receives segments until it receives a segment that is erroneous, and then informs the transmitter of the location of this segment. The receiver may or may not want to keep all the segments after this first erroneous segment. Preferably however, the receiver stores all good segments, but may want to store bad segments also, as this may be useful in certain applications. The transmitter can then retransmit all of the segments after the first erroneous segment. Sending only the first segment location is useful in cases where the amount of information that can be sent in ACK messages is limited, such that the receiver can not tell the transmitter of all erroneous segments, only first one. This is one variation of sending segments multiple times, as it retransmits erroneously received segments, and some correctly received segments, that are after the first erroneous segment.

Figure 3:
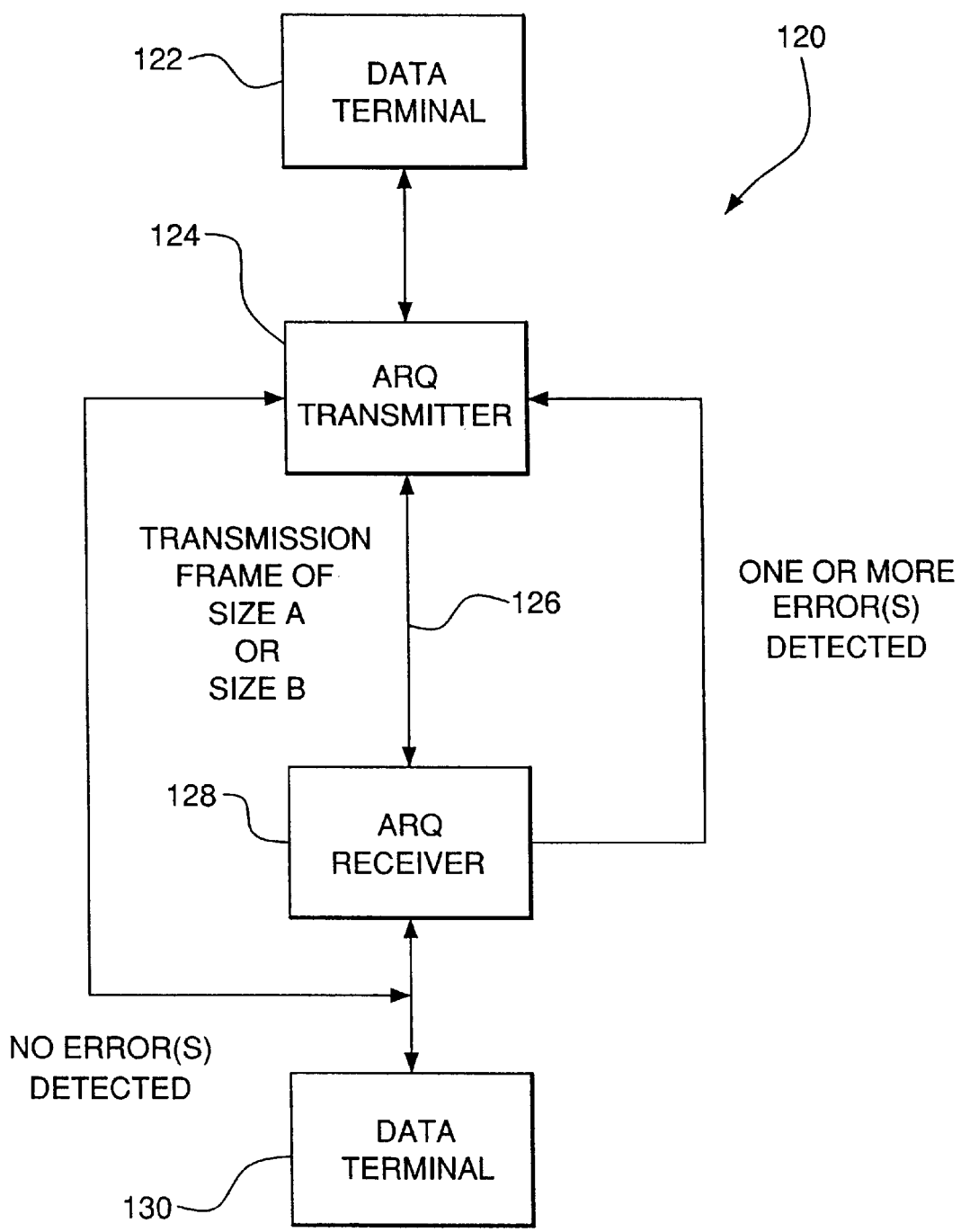
FIG. 3 is a flow chart diagram of an implementation of an embodiment of the present invention.

A flow chart representing the operation of the embodiment described above is shown in FIG. 3. FIG. 3 is a flow chart diagram of an implementation of an embodiment of the present invention, and illustrates the communication between data terminals, such as nodes 102, 106 and 107. In FIG. 3, a first data terminal 122 provides an output stream of transmission data to an ARQ transmitter 124. At the ARQ transmitter, error correction and error detection codes are attached to each segment and are then transmitted sequentially to a second data terminal. The transmission via the transmission path 126 includes transmission, and re-transmission frames, of a length described below and shown in FIG. 4. Once received by the ARQ receiver 128, successful completion is acknowledged in an ACK signal to the ARQ transmitter 124. If transmission was unsuccessful, a retransmission request is sent to the ARQ transmitter 124 as an NACK signal.

Figure 4:
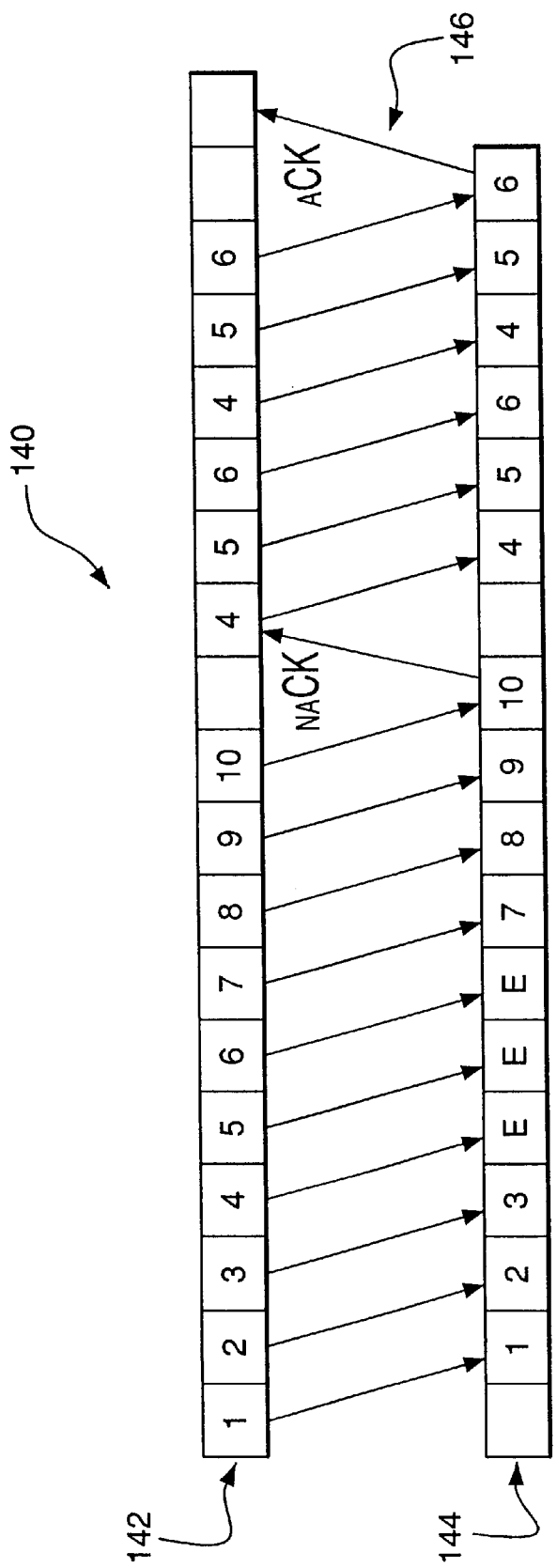
FIG. 4 is a block diagram of a series of transmission frames transmitted in accordance with an embodiment of the present invention.

Each individual transmission frame, or segment includes ARQ control data, transmission data, and error correction and error detection code. The segments are transmitted sequentially as shown in FIG. 4. One example of the length of the sequential transmission and re-transmission of frames 140, is shown in FIG. 4. In FIG. 4, a sequence of transmitted frames are shown at 142. A series of ACK and/or NACK signals are shown at 146 based upon the successful completion and detection of the sequence of frames at 144.

As shown in FIGS. 3 and 4, the media access control protocol data unit (MPDU) can be transmitted as a stream of segments 142 from a first data terminal 122, to a receiving data terminal 130. Each segment 142 contains forward error correction (FEC) and error detection encoding for foreword error correction and cyclic redundancy check error detection. As described above, the presence of an error is checked for each segment 144 of the received signals at the ARQ receiver 128, and a re-transmission request signal is transmitted to the ARQ transmitter 124 whenever an error is detected. When no errors are detected in the received signals, the ARQ receiver 128, or transceiver, outputs the received data to a reception side data terminal 130 and transmits a successful reception signal to the ARQ transmitter 124. At the receiving node, if a segment 142 has errors after forward error correction has been performed, and the segment has no information to locate the errors, the entire segment 142 has to be retransmitted. However, the algorithm of the embodiment of the present invention reduces total time by sending erroneous segments, shown in FIG. 4 as 4, 5 and 6, multiple times. As described above in association with Table 2, where sending a frame takes 20 time units and each segment takes 10 units, the data of FIG. 4 was delivered with less latency and uses 1 less transmission, which reduces control channel usage. The total time of FIG. 4 is 240 units, rather than the 260 units of a conventional ARQ technique.

The embodiment of the present invention described above serves to improve link budget by several decibels in the fading channel by using shorter packets. The embodiment also reduces overhead of retransmissions and reduces maximum time to deliver MPDU in a fading channel. Also, the following distinctions may be drawn between the embodiment of the present invention and traditional ARQ techniques. For example, the embodiment described above does not need to generate, nor require, a beginning of frame (BOF) message or a Reed Solomon or Golay code. The embodiment also does not need to arrange sub-blocks into two dimensional matrixes, nor does it need to store each transmission sub-block with error detected in memory.

The embodiment does not require specifying the number of information blocks in a message, nor providing an additional location in each physical layer frame to be transmitted. Instead, segments are shorter and multiple segments are sent per ad-hoc request-to-send/clear-to-send (RTS/CTS) sequence. No information need be included in a frame to indicate the frame is a retransmission frame, as this is not needed due to ad-hoc MAC. The embodiment also does not need to absorb excessive delay by sending multiple segments and the data link in the embodiment of the present invention need not be shared by a plurality of logical links.

As with some ARQ techniques discussed above which sequentially retransmit block sets until receiving the return signal, or retransmit only those data blocks that have been received with transmission errors without changing contents, the embodiment of the present invention uses multiple retransmissions of failed blocks. The embodiment does not require a mode of transmitting and receiving only the erroneous transmission segment again. Furthermore, the embodiment described above requires no 48-bit parity cell or temporary frame identity (TFI), and is distinct from exclusive satellite links and wireless asynchronous transfer modes (ATM).

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for data transmission using a hybrid automatic repeat request (ARQ) function for identifying and requesting retransmission of data frames received with a detected error in an ad-hoc communications network, said network including a plurality of nodes being adapted to transmit and receive signals to and from other nodes in said network, the method comprising:

dividing transmission data into a first number of segments and attaching a forward error correction and error detection code to each segment;

transmitting said first number of segments sequentially from a first node of said plurality to at least a second node of said plurality;

evaluating said first number of segments to detect and locate up to all errors present in each segment of said first number of segments, and when at least one error is detected and located, to return a negative acknowledgement (NACK) and retransmission request signal to said first node, said negative acknowledgement including said location of said at least one error;

creating a second number of segments in response to said retransmission request signal including said each segment of said first number of segments having said at least one error detected and located at said second node, and attaching at least one forward error correction and error detection code to each said segment; and transmitting said second number of segments sequentially from said first node to said second node multiple times per media access control (MAC) transaction.

2. A method as claimed in claim 1, further comprising:
returning an acknowledgement (ACK) signal to said first node when during said evaluating, no error is detected and located.

3. A method as claimed in claim 1, wherein:
said transmission data includes a media access control protocol data unit (MPDU).

4. A method as claimed in claim 3, wherein said dividing includes:
dividing a length of said media access control protocol data unit by a system constant to produce a maximum segment size; and
calculating said first number of segments based on said maximum segment size.

5. A method as claimed in claim 4, wherein:
said dividing is based on said network specific constant that is known by each node of said plurality.

6. A method as claimed in claim 4, wherein:
said calculating said first number of segments establishes segments of equal size.

7. A method as claimed in claim 4, wherein:
said calculating said first number of segments establishes at least one segment that is shorter than a remaining number of segments.

8. A method as claimed in claim 3, wherein each segment of said first number of segments includes a segment number that is sequential within said media access control protocol data unit.

9. A method as claimed in claim 1, further comprising:
attaching a parity code to each segment of said first number of segments before transmitting said first number of segments; and
wherein said evaluating includes:
verifying the accuracy of said each segment based on said parity code; and
discarding segments which fail said accuracy verification at said second node.

10. A method as claimed in claim 1, wherein said transmitting said first number of segments comprises:
transmitting said first number of segments as a physical layer packet from said first node to said second node of said plurality, said packet information identifying a length of said packet.

11. A method as claimed in claim 1, wherein said transmitting said second number of segments comprises:
transmitting said second number of segments wherein at least one segment is located in a sequential position equal to a sequential position that said at least one segment occupied in said first number of segments.

12. A method as claimed in claim 1, wherein said transmitting said second number of segments comprises:
transmitting said second number of segments wherein at least one segment is located in a sequential position equal to a position that a segment not requiring retransmission occupied in said first number of segments.

13. A method as claimed in claim 1, wherein said forward error correction includes Viterbi encoding.

14. A method as claimed in claim 1, wherein said error detection code includes a cyclic redundancy check (CRC).

15. A system for data transmission using a hybrid automatic repeat request (ARQ) function for identifying and requesting retransmission of data frames received with a detected error in an ad-hoc communications network, said network including a plurality of nodes being adapted to transmit and receive signals to and from other nodes in said network, the system comprising:

a first node, adapted to divide transmission data into a first number of segments and to attach a forward error correction and error detection code to each segment;

said first node being further adapted to transmit said first number of segments sequentially from said first node of said plurality to at least a second node of said plurality;

a second node, adapted to evaluate said first number of segments to detect and locate up to all errors present in each segment of said first number of segments, and when at least one error is detected and located, to return a negative acknowledgement (NACK) and retransmission request signal to said first node, said negative acknowledgement including said location of said at least one error;

said first node being further adapted to create a second number of segments in response to said retransmission request signal including said each segment of said first number of segments having said at least one error detected and located at said second node, and to attach at least one forward error correction and error detection code to each said segment; and said first node being further adapted to transmit said second number of segments sequentially from said first node to said second node multiple times per media access control (MAC) transaction.

16. A system as claimed in claim 15, wherein:
said second node is adapted to return an acknowledgement (ACK) signal to said first node when during said evaluating, no error is detected and located.

17. A system as claimed in claim 15, wherein:
said transmission data includes a media access control protocol data unit (MPDU).

18. A system as claimed in claim 17, wherein:
said first node is adapted to divide a length of said media access control protocol data unit by a system constant to produce a maximum segment size; and
said first node being further adapted to calculate said first number of segments based on said maximum segment size.

19. A system as claimed in claim 18, wherein:
said network specific constant is known by each node of said plurality.

20. A system as claimed in claim 18, wherein:
said first number of segments includes segments of equal size.

21. A system as claimed in claim 18, wherein:
said first number of segments includes at least one segment that is shorter than a remaining number of segments.

22. A system as claimed in claim 17, wherein:
each segment of said first number of segments includes a segment number that is sequential within said media access control protocol data unit.

23. A system as claimed in claim 15, wherein:
said first node is adapted to attach a parity code to each segment of said first number of segments before transmitting said first number of segments;
said second node is adapted to evaluate said first number of segments by verifying the accuracy of said each segment based on said parity code; and
said second node being further adapted to discard segments which fail said accuracy verification.

24. A system as claimed in claim 15, wherein:
said first node is adapted to transmit said first number of segments as a physical layer packet from said first node to said second node of said plurality, said packet information identifying a length of said packet.

25. A system as claimed in claim 15, wherein:
said first node is adapted to transmit said second number of segments wherein at least one segment is located in a sequential position equal to a sequential position that said at least one segment occupied in said first number of segments.

26. A system as claimed in claim 15, wherein:
said first node is adapted to transmit said second number of segments wherein at least one segment is located in a sequential position equal to a position that a segment not requiring retransmission occupied in said first number of segments.

27. A system as claimed in claim 15, wherein said forward error correction includes Viterbi encoding.

28. A system as claimed in claim 15, wherein said error detection code includes a cyclic redundancy check (CRC).

29. A computer-readable medium of instructions, adapted to control data transmission using a hybrid automatic repeat request (ARQ) function for identifying and requesting retransmission of data frames received with a detected error in an ad-hoc communications network, said network including a plurality of nodes being adapted to transmit and receive signals to and from other nodes in said network, the instructions comprising:
a first set of instructions, adapted to control a first node of said plurality to divide transmission data into a first number of segments, and attach a forward error correction and error detection code to each segment and to transmit said first number of segments sequentially to at least a second node of said plurality;
a second set of instructions, adapted to control said second node to evaluate said first number of segments to detect and locate up to all errors present in each segment of said first number of segments, and when at least one error is detected and located, to return a negative acknowledgement (NACK) and retransmission request signal to said first node, said negative acknowledgement including said location of said at least one error;
a third set of instructions, adapted to control said first node to create a second number of segments in response to said retransmission request signal including said each segment of said first number of segments having said at least one error detected and located at said second node, and attach at least one forward error correction and error detection code to each said segment, and to transmit said second number of segments sequentially from said first node to said second node multiple times per media access control (MAC) transaction.

30. A computer-readable medium of instructions as claimed in claim 29, wherein:
said second set of instructions is adapted to return an acknowledgement (ACK) signal to said first node when during said evaluating, no error is detected and located.

31. A computer-readable medium of instructions as claimed in claim 29, wherein:
said transmission data includes a media access control protocol data unit (MPDU).

32. A computer-readable medium of instructions as claimed in claim 31, wherein:
said first set of instructions is adapted to divide a length of said media access control protocol data unit by a system constant to produce a maximum segment size and calculate said first number of segments based on said maximum segment size.

33. A computer-readable medium of instructions as claimed in claim 32, wherein:
said first set of instructions is adapted to divide said media access control protocol data unit based on said network specific constant that is known by each node of said plurality.

34. A computer-readable medium of instructions as claimed in claim 32, wherein:
said first set of instructions is adapted to calculate said first number of segments of equal size.

35. A computer-readable medium of instructions as claimed in claim 32, wherein:
said first set of instructions is adapted to calculate at least one segment that is shorter than a remaining number of segments.

36. A computer-readable medium of instructions as claimed in claim 31, wherein:
said first set of instructions is adapted to assign each segment of said first number of segments a segment number that is sequential within said media access control protocol data unit.

37. A computer-readable medium of instructions as claimed in claim 29, further comprising:
said first set of instructions adapted to attach a parity code to each segment of said first number of segments before transmitting said first number of segments;
said second set of instruction adapted to evaluate said first number of segments by verifying the accuracy of said each segment based on said parity code; and said second set of instruction being further adapted to discard segments which fail said accuracy verification at said second node.

38. A computer-readable medium of instructions as claimed in claim 29, wherein:

said first set of instructions is adapted to transmit said first number of segments as a physical layer packet from said first node to said second node of said plurality, said packet information identifying a length of said packet.

39. A computer-readable medium of instructions as claimed in claim 29, wherein:

said third set of instructions is adapted to transmit said second number of segments wherein at least one segment is located in a sequential position equal to a sequential position that said at least one segment occupied in said first number of segments.

40. A computer-readable medium of instructions as claimed in claim 29, wherein:

said third set of instructions is adapted to transmit said second number of segments wherein at least one segment is located in a sequential position equal to a position that a segment not requiring retransmission occupied in said first number of segments.

* * * * *